United States Patent
Suzuki et al.

(10) Patent No.: US 11,837,380 B2
(45) Date of Patent: Dec. 5, 2023

(54) SUPERCONDUCTING WIRE ROD, SUPERCONDUCTING COIL, MAGNETIC GENERATOR, AND METHOD FOR PRODUCING SUPERCONDUCTING WIRE ROD

(71) Applicant: HITACHI, LTD., Tokyo (JP)

(72) Inventors: Takaaki Suzuki, Tokyo (JP); Hideki Tanaka, Tokyo (JP); Motomune Kodama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 598 days.

(21) Appl. No.: 17/053,839

(22) PCT Filed: Feb. 27, 2019

(86) PCT No.: PCT/JP2019/007702
§ 371 (c)(1),
(2) Date: Nov. 9, 2020

(87) PCT Pub. No.: WO2020/039623
PCT Pub. Date: Feb. 27, 2020

(65) Prior Publication Data
US 2021/0233685 A1    Jul. 29, 2021

(30) Foreign Application Priority Data

Aug. 24, 2018  (JP) ................. 2018-156960

(51) Int. Cl.
*H01B 12/08*  (2006.01)
*H01F 6/06*   (2006.01)
*H01F 6/00*   (2006.01)

(52) U.S. Cl.
CPC .............. *H01B 12/08* (2013.01); *H01F 6/00* (2013.01); *H01F 6/06* (2013.01)

(58) Field of Classification Search
CPC .......... C01B 35/04; C01G 1/00; H01B 12/08; H01B 12/10; H01B 13/0006; H01F 6/00;
(Continued)

(56) References Cited

U.S. PATENT DOCUMENTS

2002/0198111 A1* 12/2002 Tomsic ............. H10N 60/0856
                                                          29/599
2003/0181303 A1*  9/2003 Leinonen ............ D21G 1/0266
                                                           492/53
(Continued)

FOREIGN PATENT DOCUMENTS

EP      3419030 A       12/2018
JP      2008-508677 A    3/2008
(Continued)

OTHER PUBLICATIONS

International Search Report of PCT/JP2019/007702 dated Apr. 23, 2019.

*Primary Examiner* — Timothy J Thompson
*Assistant Examiner* — Guillermo J Egoavil
(74) *Attorney, Agent, or Firm* — Mattingly & Malur, PC

(57) ABSTRACT

Provided are: a superconducting wire rod in which the non-uniform deformation of the shape of an $MgB_2$ core material has been controlled; a superconducting coil; a magnetic generator; and a method for producing a superconducting wire rod. A superconducting wire rod (100A) according to the present invention comprises: a center material (106) of which at least the outer circumferential surface is formed of a metal that does not react with Mg; a plurality of single-core wires (103) disposed around the center material (106), each of the single-core wires having an $MgB_2$ superconductor core material (101) coated with a first coating material (102) made of a metal that does not react with Mg; and an outer shell material (105) disposed outside the plurality of single-core wires (103), wherein at
(Continued)

least the inner circumferential surface of the outer shell material (105) is formed of a metal that does not react with Mg.

9 Claims, 6 Drawing Sheets

(58) Field of Classification Search
CPC ....... H01F 6/06; Y02E 40/60; H10N 60/0856; H10N 60/202
USPC ...................................................... 174/125.1
See application file for complete search history.

(56) References Cited

U.S. PATENT DOCUMENTS

| | | | |
|---|---|---|---|
| 2008/0246567 A1* | 10/2008 | Isogami | ................... H01F 6/04 335/216 |
| 2009/0005251 A1 | 1/2009 | Fluekiger et al. | |
| 2009/0305897 A1 | 12/2009 | Grasso et al. | |

FOREIGN PATENT DOCUMENTS

| | | | | |
|---|---|---|---|---|
| JP | 2008-091325 A | 4/2008 | | |
| WO | 2017/141410 A1 | 8/2017 | | |
| WO | WO-2017141410 A1 * | 8/2017 | ............. | H01B 12/10 |

\* cited by examiner

[FIG. 1]
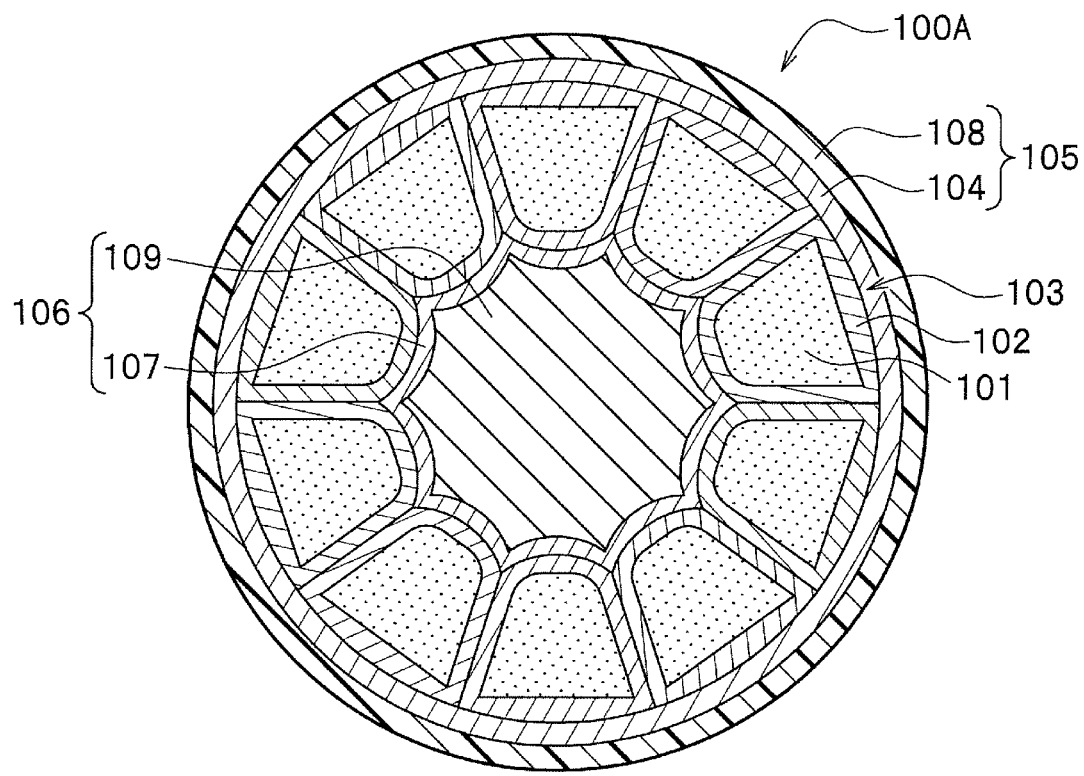
[FIG. 2]
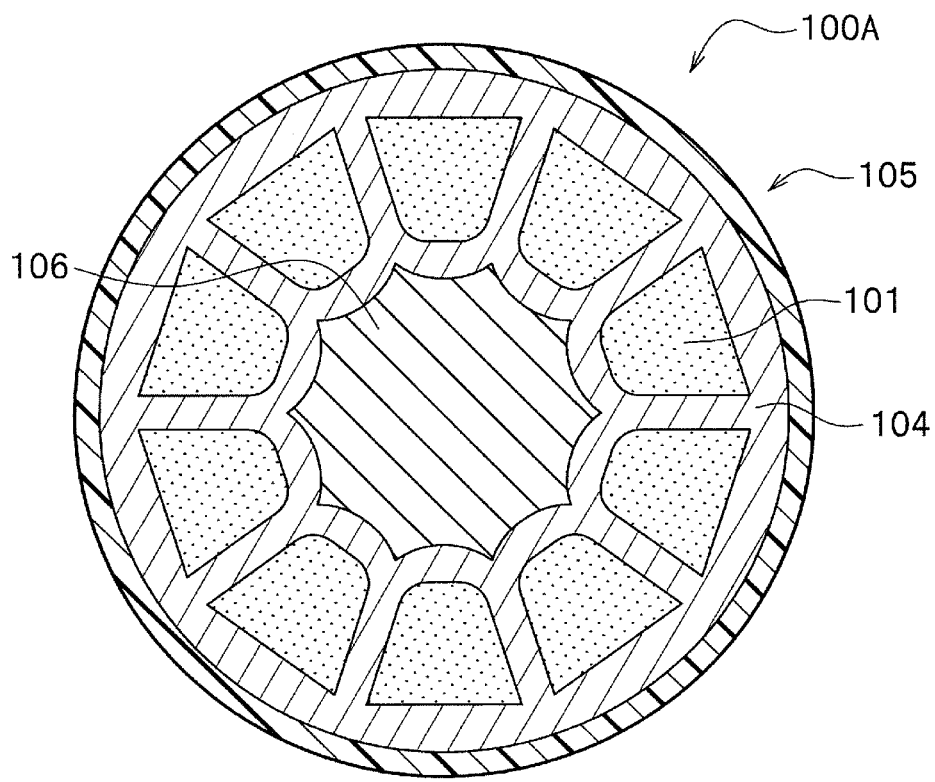

[FIG. 3]
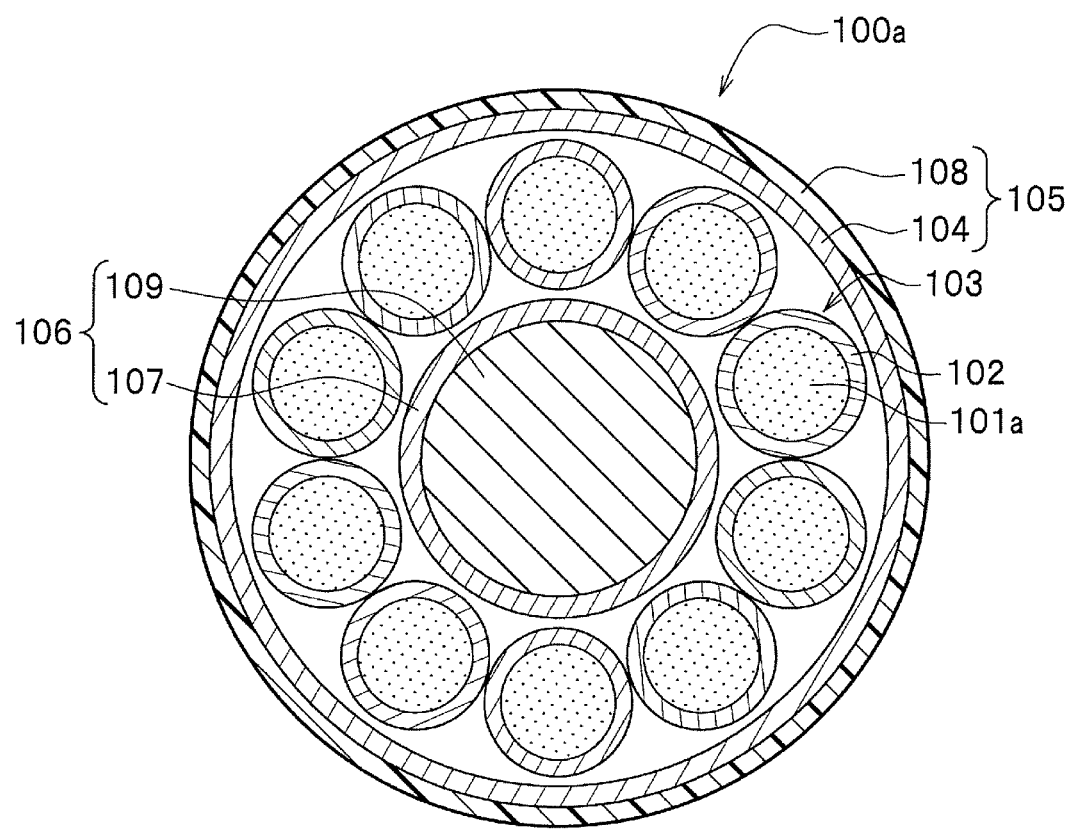

[FIG. 4]
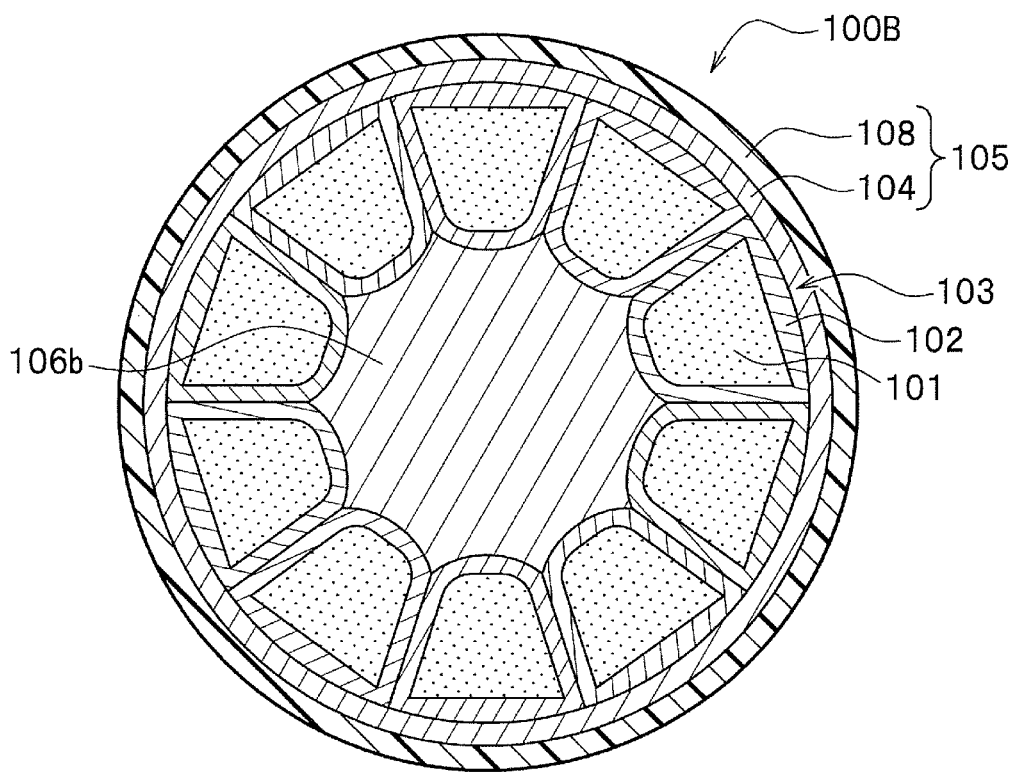
[FIG. 5]
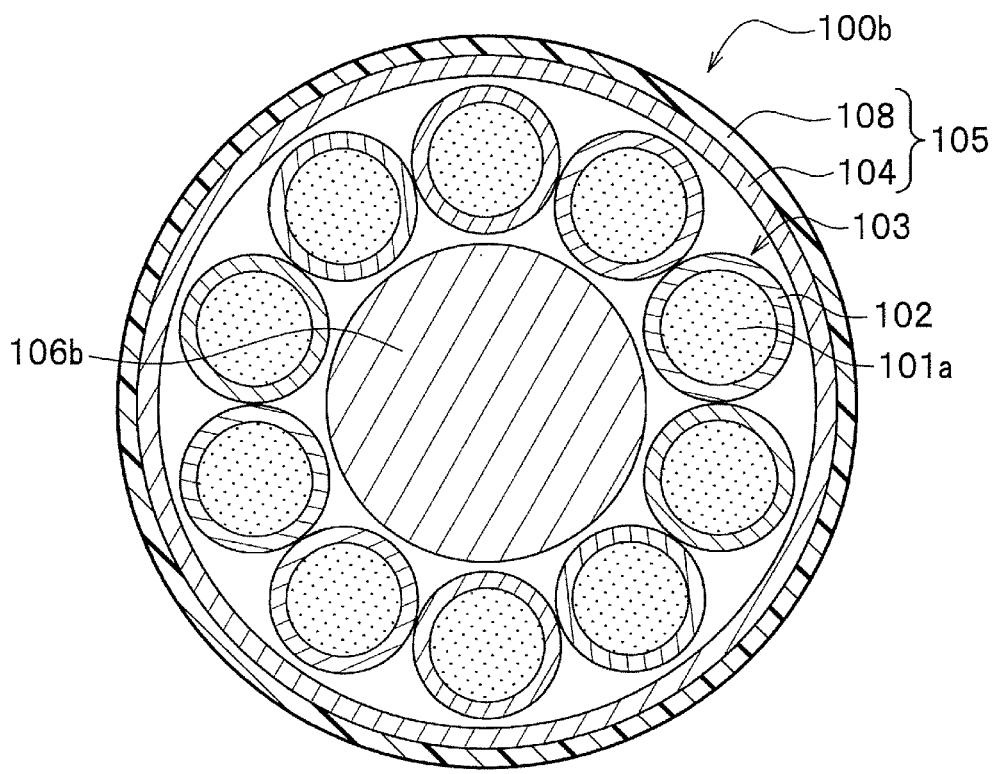

[FIG. 6]
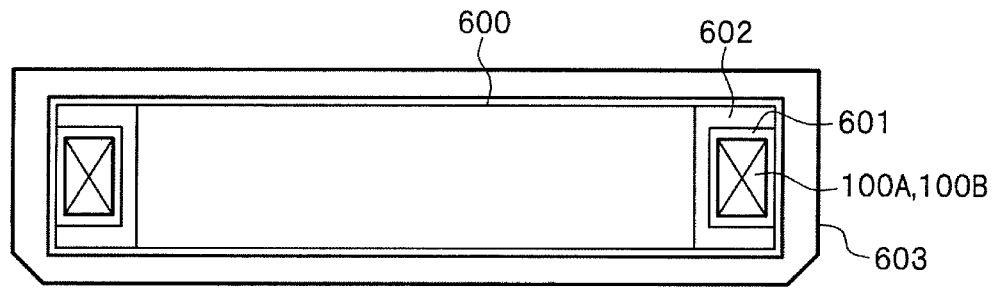
[FIG. 7]
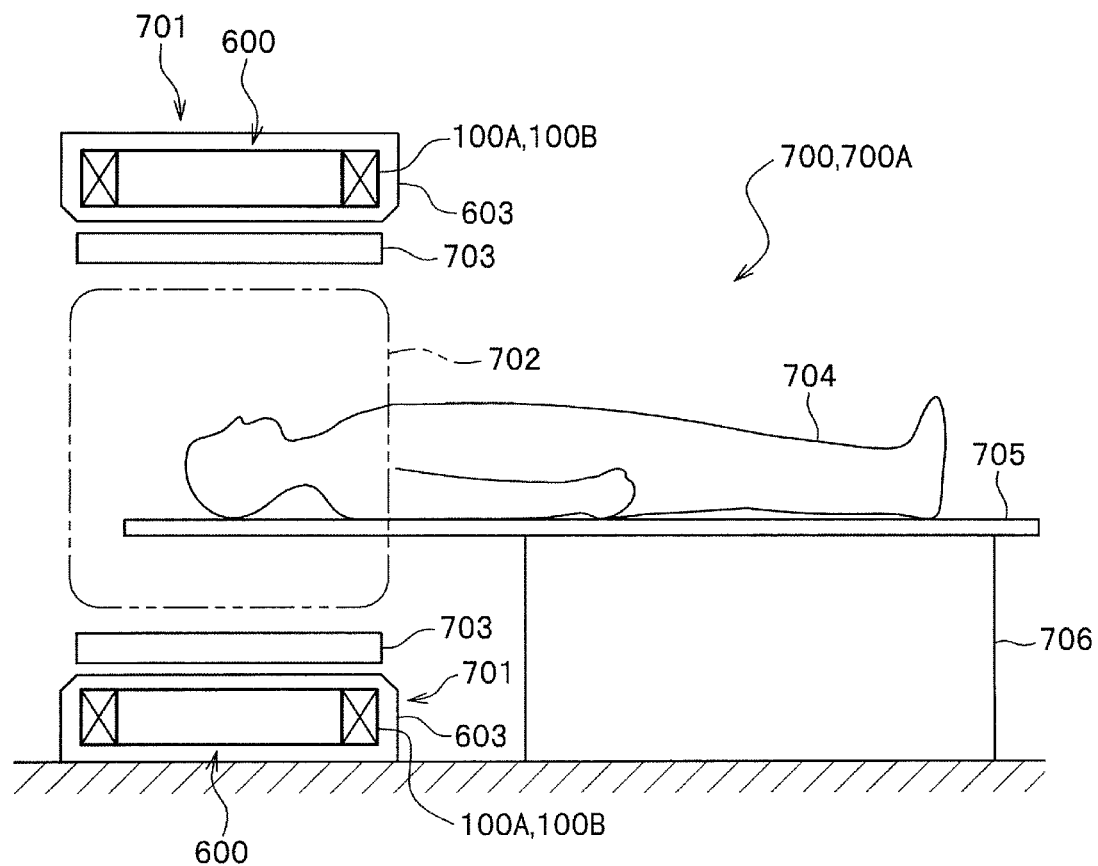

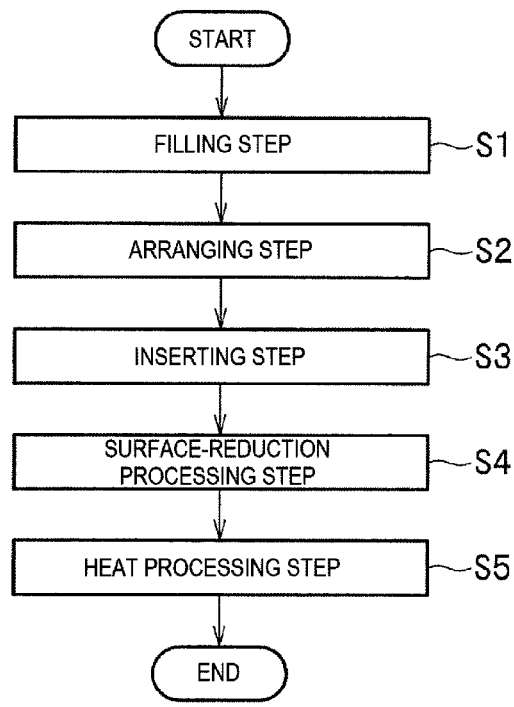
[FIG. 8]

[FIG. 9]
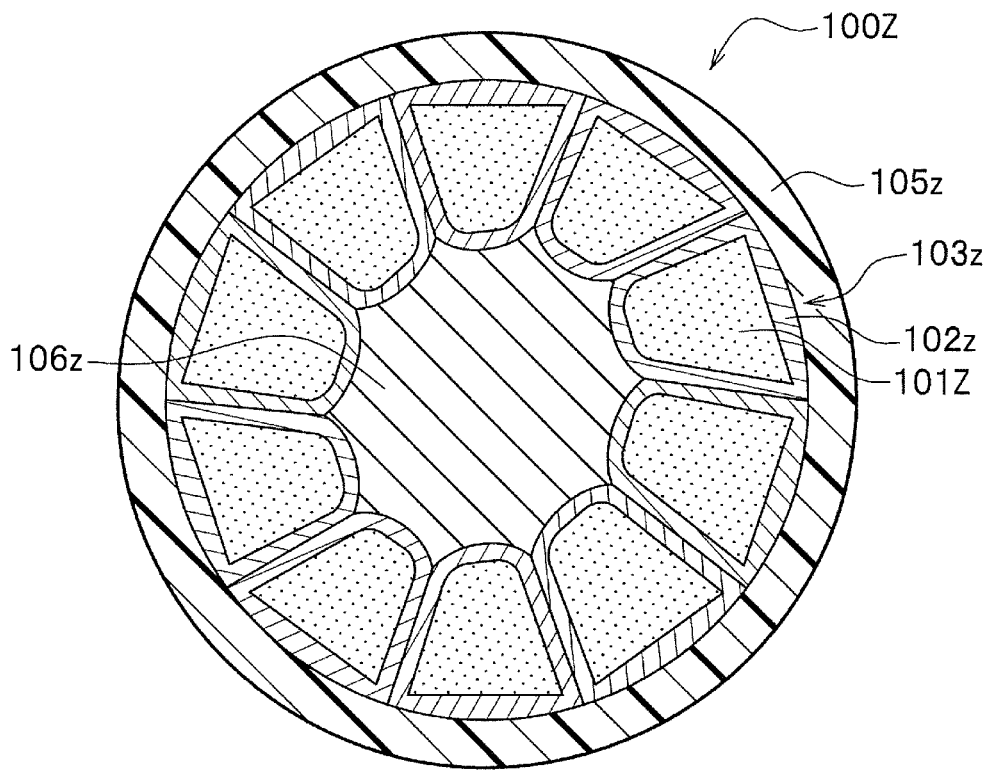
[FIG. 10]
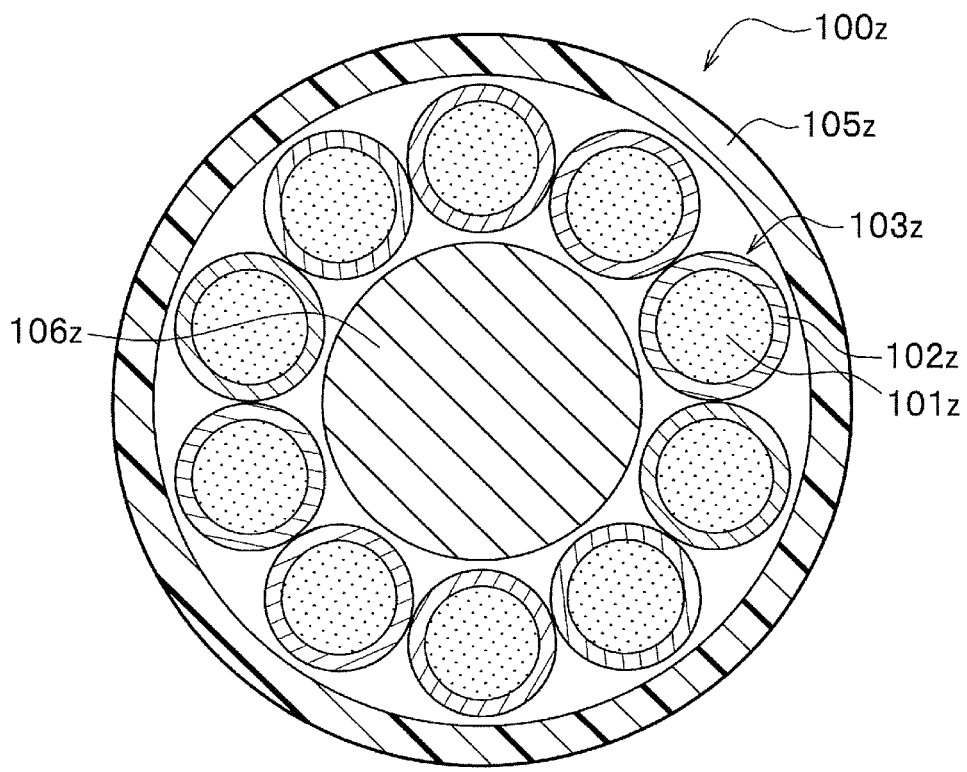

SUPERCONDUCTING WIRE ROD, SUPERCONDUCTING COIL, MAGNETIC GENERATOR, AND METHOD FOR PRODUCING SUPERCONDUCTING WIRE ROD

TECHNICAL FIELD

The present invention relates to a superconducting wire rod using an $MgB_2$ superconductor, a superconducting coil, a magnetic generator, and a method for producing the superconducting wire rod.

BACKGROUND ART

An advantage of a superconducting wire rod is that the superconducting wire rod can pass a current with zero resistance. Among superconducting materials, an $MgB_2$ superconductor has a highest critical temperature (approximately 39K) as a metallic superconductor. Therefore, the $MgB_2$ superconductor has a feature that the $MgB_2$ superconductor can maintain a superconducting state without being cooled to a boiling point of helium of 4.2 K, and is expected as an excellent superconducting material.

As a general method for producing an $MgB_2$ superconducting wire rod using an $MgB_2$ superconductor, there is a Powder in Tube (PIT) method in which a powder is filled in a metal tube as a raw material and is subjected to wire processing. The PIT method includes a method (ex-situ method) using a powder synthesized in advance in $MgB_2$ as a raw material powder, and a method (in-situ method) in which $MgB_2$ is synthesized by performing heat treatment after wire processing using a mixed powder obtained by mixing a magnesium powder and a boron powder.

In a superconducting wire rod which has been put to practical use, a multifilamentary wire in which a plurality of superconducting filaments having a reduced wire diameter are bundled is used for a purpose of stably retaining a flux.

For example, PTL 1 describes a precursor of a superconducting wire rod that includes a center material, a mixed powder element disposed around the center material, and an outer shell layer disposed outside the center material and the mixed powder element. In the precursor of the superconducting wire rod, the mixed powder element is formed of a mixed powder containing a magnesium powder and a boron powder, and a metal sheath material covering the mixed powder. The outer shell layer has a Vickers hardness higher than that of the center material.

For example, PTL 2 describes a superconducting composite wire including a superconducting phase formed of magnesium diboride. The superconducting composite wire includes: a core formed of a conductive metal (1); a plurality of filaments (3) including a core of magnesium diboride and disposed around the conductive metal core (1); an outer metallic sheath (4) for containment and mechanical reinforcement surrounding the plurality of filaments (3); and at least one layer (2, 2a, 2b) formed of a metal that is chemically compatible with magnesium diboride and that is capable of acting as an obstacle to diffusion of the conductive metal of the core (1) towards the filaments (3). Further, in the superconducting composite wire described in PTL 2, the layer is applied a) as a coating (2) of the conductive metal core and/or b) as a coating (2a, 2b) of the filaments (3).

CITATION LIST

Patent Literature

PTL 1: WO 2017/141410
PTL 2: JP-T-2008-508677

SUMMARY OF INVENTION

Technical Problem

According to the results of research so far, it has been found that, in a multifilamentary wire using an $MgB_2$ superconductor, a shape of a core material ($MgB_2$ core material) using an $MgB_2$ superconductor is deformed unevenly during wire processing depending on a material and layout of a center material, an $MgB_2$ monofilamentary wire, and an outer circumferential material that form the multifilamentary wire. For example, when Cu is disposed at a center, the multifilamentary wire is likely to be deformed due to deformation of soft Cu, and is also likely to be deformed unevenly due to influence of area reduction of a metal disposed on an outer circumference. Therefore, superconducting properties may deteriorate due to a decrease in an area of an $MgB_2$ core material or the like.

The invention has been made in view of the above circumstances, and an object of the invention is to provide a superconducting wire rod in which uneven deformation of a shape of an $MgB_2$ core material is prevented, a superconducting coil, a magnetic generator, and a method for producing the superconducting wire rod.

Solution to Problem

As a result of intensive research and development for solving the above problems, the present inventors have found that the problems can be solved by the following, and have completed the invention.

A superconducting wire rod according to the invention includes: a center material of which at least an outer circumferential surface is formed of a metal that does not react with Mg; a plurality of monofilamentary wires arranged around the center material, the plurality of monofilamentary wires each including an $MgB_2$ superconductor core material coated with a first coating material formed of a metal that does not react with Mg; and an outer shell material disposed outside the plurality of monofilamentary wires, in which at least an inner circumferential surface of the outer shell material is formed of a metal that does not react with Mg.

Advantageous Effect

According to the invention, a superconducting wire rod in which uneven deformation of a shape of an $MgB_2$ core material is prevented, a superconducting coil, a magnetic generator, and a method for producing the superconducting wire rod can be provided.

Problems, configurations, and effects other than those described above will become apparent from the following description of embodiments.

BRIEF DESCRIPTION OF DRAWINGS

FIG. 1 is a schematic cross-sectional view of a superconducting wire rod 100A according to a first embodiment.

FIG. 2 is a schematic cross-sectional view of the superconducting wire rod 100A according to the first embodiment.

FIG. 3 is a schematic cross-sectional view of an embedded material 100a before wire processing according to the first embodiment.

FIG. 4 is a schematic cross-sectional view of a superconducting wire rod 100B according to a second embodiment.

FIG. 5 is a schematic cross-sectional view of an embedded material 100b before wire processing according to the second embodiment.

FIG. 6 is a schematic configuration diagram showing a configuration of a superconducting coil 600 according to the present embodiment.

FIG. 7 is a schematic configuration diagram showing a configuration of a magnetic generator 700 according to the present embodiment.

FIG. 8 is a flowchart showing a content of a method for producing a superconducting wire rod according to the present embodiment.

FIG. 9 is a schematic cross-sectional view of a superconducting wire rod 100Z according to a comparative example.

FIG. 10 is a schematic cross-sectional view of an embedded material 100z before wire processing according to the comparative example.

DESCRIPTION OF EMBODIMENTS

Hereinafter, embodiments of the invention will be described in detail with reference to the drawings. In each drawing, common constituent elements are denoted by the same reference numerals, and a redundant description may be omitted. A size and a shape of a member may be schematically represented by deformation or exaggeration for convenience of description.

Superconducting Wire Rod 100A

First Embodiment

FIGS. 1 and 2 are schematic cross-sectional views of a superconducting wire rod 100A according to a first embodiment. FIG. 1 is a drawing based on an optical microscope image after chemical etching processing. FIG. 2 is a drawing based on an optical microscope image taken without performing the chemical etching processing. When a cross-section of the superconducting wire rod 100A is simply observed, there is a portion where it is difficult to distinguish constituent elements as shown in FIG. 2, but the chemical etching processing makes it possible to make a boundary between the constituent elements more conspicuous and facilitates the distinction. Therefore, the first embodiment will be described mainly with reference to FIG. 1. A cross-sectional shape of the superconducting wire rod 100A shown in FIGS. 1 and 2 is an example, and the invention is not limited to the one shown in the drawings. The cross-sectional shape of the superconducting wire rod 100A can be optionally set depending on a material of a center material 106, a material of a monofilamentary wire 103, the number of embedded wires, an arrangement position, and the like. The chemical etching processing for examining the constituent elements may be performed under any conditions as long as the boundary between the constituent elements can be made conspicuous.

As shown in FIG. 1, the superconducting wire rod 100A includes the center material 106 of which at least an outer circumferential surface is formed of a metal that does not react with Mg. The superconducting wire rod 100A includes a plurality of monofilamentary wires 103 disposed around the center material 106. The monofilamentary wire 103 includes an $MgB_2$ superconductor core material ($MgB_2$ core material) 101 coated with a first coating material 102 formed of the metal that does not react with Mg. The superconducting wire rod 100A includes an outer shell material 105 disposed outside the plurality of monofilamentary wires 103.

The superconducting wire rod 100A has a structure in which the metal that does not react with Mg is used for at least an outer circumferential surface of the center material 106 (specifically, a second coating material 107 to be described later), a coating layer (first coating material 102) of the $MgB_2$ core material 101, and an inner circumferential surface (specifically, a relaxation layer 104 to be described later) of the outer shell material 105. By doing so, in the superconducting wire rod 100A, it is possible to prevent uneven deformation of a shape of the $MgB_2$ core material 101 due to an influence of a shape change of the center material 106 and the outer shell material 105 during surface-reduction processing which is insufficient only with the embedded monofilamentary wire sheath material ($MgB_2$ core sheath material) in the related art.

Further, it is preferable that, in the superconducting wire rod 100A, the same metal material is used as the metal that does not react with Mg and that is used for the outer circumferential surface of the center material 106, the coating layer of the $MgB_2$ core material 101 and the inner circumferential surface of the outer shell material 105. It is considered that, when each part is coated and disposed with a different metal material, a difference in properties of metal material such as hardness and elongation may adversely affect processability. However, when each part is formed of the same metal material as in the preferred embodiment, such an influence can be significantly reduced. As a result, according to the preferred embodiment, the uneven deformation of the shape of the $MgB_2$ core material 101 can be further prevented. Since no abnormal deformation occurs in each $MgB_2$ core material 101, a reduction of area of the $MgB_2$ core material 101 and a reaction with Cu when Cu is disposed on the center material 106 can be prevented.

Center Material 106

The center material 106 is disposed at a center of the superconducting wire rod 100A. As described above, at least the outer circumferential surface of the center material 106 is formed of the metal that does not react with Mg. Specifically, as shown in FIG. 1, the center material 106 is formed of, for example, a core 109 formed of a metal capable of reacting with Mg, and the second coating material 107 formed of the metal that does not react with Mg and coating the core 109. By disposing the second coating material 107, the center material 106 can prevent the uneven deformation of the $MgB_2$ core material 101. In particular, when Cu is used for the core 109 disposed at the center, Cu is soft and easily deformed, so the monofilamentary wire 103 is likely to be deformed unevenly under the influence thereof. By disposing the second coating material 107, deformation of Cu can be prevented, and the uneven deformation can be prevented.

Examples of the metal that does not react with Mg and is used for the outer circumferential surface of the center material 106 include at least one selected from a group of Fe, Nb, and Ta, and Fe is preferable among Fe, Nb, and Ta. In this case, since at least the outer circumferential surface of the center material 106 is formed of (coated with) the metal that does not react with Mg, for example, when Cu is used for the core 109, the deformation of Cu can be prevented, and the uneven deformation can be prevented. The metal that does not react with Mg may be an alloy containing any one of Fe, Nb, and Ta as a main component as long as the alloy does not impair effects of the invention.

In the present embodiment, the center material 106 plays a role of stabilizing a current by bypassing the current when a superconducting state of the $MgB_2$ core material 101 disappears. Therefore, the center material 106 is preferably formed of a material having good electrical conductivity. The center material 106 is preferably formed of a material having good ductility (processability) because the center material 106 is subjected to surface-reduction processing (wire processing) in production of a wire rod. For these reasons, as the core 109 of the center material 106 in the present embodiment, Cu is preferably used, and oxygen-free copper is more preferably used.

Monofilamentary Wire 103

As described above, the monofilamentary wire 103 includes the $MgB_2$ core material 101 that functions as a superconducting material and is coated with the first coating material 102 formed of the metal that does not react with Mg. As described above, in the monofilamentary wire 103, since the first coating material 102 coating the $MgB_2$ core material 101 is formed of the metal that does not react with Mg, it is possible to prevent the uneven deformation of the shape of the $MgB_2$ core material 101 due to the influence of the shape change of the center material 106 and the outer shell material 105 during the surface-reduction processing. In the present embodiment, as shown in FIG. 1, the number of the monofilamentary wires 103 is set to 10, but the number is not limited thereto, and can be set optionally according to required wire rod performance. The metal that does not react with Mg and can be used in the first coating material 102 is the same as that described in the center material 106.

A thickness of the first coating material 102 is preferably larger than a thickness of the second coating material 107. When the thicknesses of the first coating material 102 and the second coating material 107 are in such a relationship, it is possible to further prevent the uneven deformation of the shape of the $MgB_2$ core material 101 due to the influence of deformation of the center material 106 and the outer shell material 105 during the surface-reduction processing and the like since the thickness of the first coating material 102 is large.

Outer Shell Material 105

As described above, the outer shell material 105 is disposed outside the plurality of monofilamentary wires 103 centered on the center material 106 and disposed around the center material 106. With such a configuration, the outer shell material 105 imparts mechanical properties such as strength to the superconducting wire rod 100A.

Further, in the present embodiment, at least the inner circumferential surface of the outer shell material 105 is formed of the metal that does not react with Mg. Specifically, as shown in FIG. 1, the outer shell material 105 includes at least two layers, and an innermost layer is the relaxation layer 104 formed of the metal that does not react with Mg. In the wire processing using a die, a stress is high on a surface of a wire rod directly under the die. Therefore, when only an outer layer material 108 of the outer shell material 105 is disposed, the monofilamentary wire 103 is affected by the deformation due to an inner area reduction of the outer layer material 108, and the uneven deformation is likely to occur. In the present embodiment, it is possible to reduce the influence of the deformation of the outer layer material 108, especially to an inside by providing the relaxation layer 104. The relaxation layer 104 and the outer layer material 108 will be described later. The metal that does not react with Mg and that can be used in the outer shell material 105 is the same as that described in the center material 106.

As described above, it is preferable that the first coating material 102, the outer circumferential surface (specifically, the second coating material 107) of the center material 106, and the inner circumferential surface (specifically, the relaxation layer 104) of the outer shell material 105 are formed of the same metal. It is considered that, when each portion is coated and disposed with a different metal material, a difference in properties of the metal material may adversely affect processability. By forming each of the above-described members with the same metal material as in the present embodiment, such an influence can be significantly reduced, and as a result, the uneven deformation of the shape of the $MgB_2$ core material 101 can be further prevented.

The outer layer material 108 disposed outside the relaxation layer 104 can be suitably formed using, for example, an alloy (Monel (registered trademark)) in which Cu is added to Ni in a range of 20 mass % to 80 mass %.

The thickness of the first coating material 102 is preferably larger than the thickness of the relaxation layer 104. When the thicknesses of the first coating material 102 and the relaxation layer 104 are in such a relationship, it is possible to further prevent the uneven deformation of the shape of the $MgB_2$ core material 101 due to the influence of deformation of the center material 106 and the outer shell material 105 during the surface-reduction processing and the like since the thickness of the first coating material 102 is large.

In the present embodiment, a Cu layer (not shown) can be formed by applying Cu to the outer circumferential surface of the outer shell material 105 after wire processing by a method such as plating or vapor deposition. The Cu layer can be formed by, for example, placing the superconducting wire rod 100A inside a long member formed of Cu and having a substantially U-shaped cross section and performing the surface-reduction processing. That is, the outer shell material 105 may have a three-layer structure. In this way, a ratio of Cu in the superconducting wire rod 100A can be adjusted, and electrical resistivity can be prevented, thereby improving stability when the superconducting state of the superconducting wire rod 100A disappears. When the superconducting state of the $MgB_2$ core material 101 disappears, the superconducting wire rod 100A generates heat. However, the superconducting wire rod 100A is less likely to burn since the Cu layer is formed on the outer circumferential surface of the outer shell material 105 after wire processing or the like and the electrical resistivity is adjusted, as in the present embodiment.

FIG. 3 is a schematic cross-sectional view of an embedded material 100a before wire processing according to the first embodiment. That is, when the embedded material 100a shown in FIG. 3 is thinned and subjected to heat treatment, the superconducting wire rod 100A shown in FIGS. 1 and 2 is obtained.

A wire diameter (thickness) of the superconducting wire rod 100A shown in FIGS. 1 and 2 is, for example, 0.5 mm φ to 2 mm φ, and a wire diameter (thickness) of the embedded material 100a shown in FIG. 3 is, for example, more than 30 mm φ. However, the invention is not limited thereto.

As shown in FIG. 3, the embedded material 100a before wire processing includes the center material 106 having a circular cross section and formed by the core 109 and the second coating material 107. The embedded material 100a includes the plurality of monofilamentary wires 103 having a circular cross section and disposed around the center material 106. The embedded material 100a includes the outer shell material 105 disposed outside the plurality of monofilamentary wires 103. At least the inner circumferential surface of the outer shell material 105 is formed of the metal that does not react with Mg. Specifically, as shown in FIG. 3, the outer shell material 105 includes the relaxation layer 104 of which an innermost layer is formed of the metal that does not react with Mg. These constituent elements are the same as those of the superconducting wire rod 100A according to the first embodiment described above.

Since the embedded material 100a shown in FIG. 3 has not been subjected to the heat treatment, what is coated with the first coating material 102 of the monofilamentary wire 103 is a mixed powder 101a of an Mg powder and a B powder. The mixed powder 101a is processed into a target wire diameter, and then subjected to the heat treatment to generate $MgB_2$ to become the $MgB_2$ core material 101. A temperature of the heat treatment is, for example, 600° C., but is not limited thereto as long as the reaction can occur.

The heat treatment is performed in manufacturing a superconducting coil 600 (see FIG. 6). The superconducting coil 600 is preferably manufactured by a wind and react method. When the method is adopted, the thinned embedded material 100a (a cross-sectional shape of the embedded material 100a is formed into a shape shown in FIG. 1 by performing wire processing) is wound around a bobbin 602 (see FIG. 6) to form the superconducting coil 600 (see FIG. 6), and then the heat treatment is performed to obtain the superconducting wire rod 100A. The present embodiment is not limited to this method. When the wind and react method is performed, it is preferable to use a glass braid that can withstand the heat treatment as an insulating material 601 applied to the bobbin 602 and the superconducting wire rod 100A. The superconducting wire rod 100A wound around the bobbin 602 is fixed in this state by performing resin impregnation or the like as necessary.

When the center material 106 of the embedded material 100a is formed of the core 109 and the second coating material 107, the thickness of the first coating material 102 is preferably larger than the thickness of the second coating material 107. The core 109 is formed of a metal capable of reacting with Mg. The second coating material 107 is formed of the metal that does not react with Mg and coats the core 109. When the thicknesses of the first coating material 102 and the second coating material 107 are in such a relationship, it is possible to further prevent the uneven deformation of the shape of the $MgB_2$ core material 101 due to the influence of deformation of the center material 106 and the outer shell material 105 during the surface-reduction processing and the like since the thickness of the first coating material 102 is large.

When the outer shell material 105 of the embedded material 100a has at least two layers and the innermost layer is the relaxation layer 104 formed of the metal that does not react with Mg, the thickness of the first coating material 102 is preferably larger than the thickness of the relaxation layer 104. When the thicknesses of the first coating material 102 and the relaxation layer 104 are in such a relationship, it is possible to further prevent the uneven deformation of the shape of the $MgB_2$ core material 101 due to the influence of deformation of the center material 106 and the outer shell material 105 during the surface-reduction processing and the like since the thickness of the first coating material 102 is large.

Second Embodiment

FIG. 4 is a schematic cross-sectional view of a superconducting wire rod 100B according to a second embodiment. FIG. 4 is a drawing based on an optical microscope image after chemical etching processing. FIG. 5 is a schematic cross-sectional view of an embedded material 100b before wire processing according to the second embodiment. That is, when the embedded material 100b shown in FIG. 5 is thinned and subjected to heat treatment, the superconducting wire rod 100B shown in FIG. 4 is obtained.

For the superconducting wire rod 100B shown in FIG. 4 according to the second embodiment and the superconducting wire rod 100A shown in FIG. 1 according to the first embodiment, a configuration of a center material 106b of the superconducting wire rod 100B is different from that of the center material 106 of the superconducting wire rod 100A.

Similarly, for the embedded material 100b shown in FIG. 5 according to the second embodiment and the embedded material 100a shown in FIG. 3 according to the first embodiment, which are in a state before being thinned, a configuration of the center material 106b of the embedded material 100b is different from that of the center material 106 of the embedded material 100a.

As described in the first embodiment, at least the outer circumferential surface of the center material 106 is formed of the metal that does not react with Mg. Therefore, the center material 106b of the superconducting wire rod 100B is formed of only the metal that does not react with Mg (that is, a whole of the center material 106b is formed of the metal that does not react with Mg). In this way, the superconducting wire rod 100B has no metal that reacts with Mg inside. Since at least the outer circumferential surface of the center material 106b is formed of only the metal that does not react with Mg (the whole of the center material 106b is formed of the metal that does not react with Mg), it is possible to contribute to prevent uneven deformation of a shape of the $MgB_2$ core material 101.

As the metal that does not react with Mg and forms the center material 106b, the same metal as that described for the center material 106 in the first embodiment can be used. Obviously, even in a case of such a configuration, in the superconducting wire rod 100B, the first coating material 102 formed of a metal that does not react with Mg and at least the inner circumferential surface (specifically, the relaxation layer 104) of the outer shell material 105 are formed of the metal that does not react with Mg. Therefore, in the superconducting wire rod 100B, it is possible to prevent uneven deformation of a shape of the $MgB_2$ core material 101 due to influence of deformation of the center material 106 and the outer shell material 105 during surface-reduction processing which is insufficient only by providing a coating material on a monofilamentary wire as in the superconducting wire rod in the related art and the like.

It is possible to optionally select whether the center material 106 is formed of the core 109 and the second coating material 107 as in the first embodiment or the center material 106b is formed of the metal that does not react with Mg as in the second embodiment. The core 109 is formed of the metal capable of reacting with Mg. The second coating material 107 is formed of the metal that does not react with Mg and coats the core 109.

Superconducting Coil 600

FIG. 6 is a schematic configuration diagram showing a configuration of the superconducting coil 600 according to the present embodiment.

The superconducting coil 600 according to the present embodiment uses the superconducting wire rod 100A described in the first embodiment or the superconducting wire rod 100B described in the second embodiment. As shown in FIG. 6, the superconducting coil 600 includes, for example, the bobbin 602 formed of a metal and coated with the insulating material 601 such as a glass braid, the superconducting wire rod 100A (100B) that is wound around the bobbin 602 at a predetermined position, that is thinned, and that is coated with the insulating material 601, and a resin (not shown) for fixing the superconducting wire rod 100A. The superconducting coil 600 is subjected to the heat treatment described above while being wound around the bobbin 602 at a predetermined position, and the mixed powder 101a is used as the MgB$_2$ core material 101 (neither is shown in FIG. 6). The superconducting coil 600 is fixed by being impregnated with a resin after the heat treatment. Here, although a glass braid is used as the insulating material 601, any insulating material can be used as long as the insulating material can withstand the heat treatment.

As shown in FIG. 6, the superconducting coil 600 is set in a cryostat 603, and is energized while being cooled by a refrigerant or a refrigerator, so that a magnetic generator 700 (see FIG. 7) capable of generating magnetism can be manufactured.

Magnetic Generator 700

FIG. 7 is a schematic configuration diagram showing a configuration of the magnetic generator 700 according to the present embodiment. FIG. 7 shows an open type magnetic resonance imaging (MRI) device 700A as an example of the magnetic generator 700.

The MRI device 700A includes a pair of static magnetic field generating units 701 and 701 and a coupling member (not shown). A space formed by the pair of static magnetic field generating units 701 and 701 and the coupling member is referred to as an imaging area 702. Gradient magnetic field generating units 703 and 703 are disposed so as to sandwich the imaging area 702. The MRI device 700A includes a bed 705 on which an object 704 is placed, and a conveyance mechanism 706 that conveys the object 704 placed on the bed 705 to the imaging area 702.

In the pair of static magnetic field generating units 701 and 701, the superconducting coil 600 described with reference to FIG. 6 is set in the cryostat 603, and is cooled by the refrigerant or the refrigerator. The pair of static magnetic field generating units 701 and 701 are energized in this state to generate a static magnetic field.

The MRI device 700A includes, as an element other than the above-described constituent elements, a device generally provided in an MRI device such as a radio frequency (RF) transmission unit, a reception coil, a control device, and an analysis device.

Method for Producing Superconducting Wire Rod

FIG. 8 is a flowchart showing a content of a method for producing the superconducting wire rod according to the present embodiment.

As shown in FIG. 8, the producing method includes a filling step S1, an arranging step S2, an inserting step S3, a surface-reduction processing step S4, and a heat treatment step S5.

Filling Step S1

The filling step S1 is a step of manufacturing the monofilamentary wire 103 by performing a step of filling the mixed powder 101a of the Mg powder and the B powder into the first coating material 102 formed of the metal that does not react with Mg and subsequently a step of wire processing. An example of the first coating material 102 is a metal pipe formed of the metal that does not react with Mg.

Arranging Step S2

The arranging step S2 is a step of arranging a plurality of monofilamentary wires 103 around the center material 106 of which at least the outer circumferential surface is formed of the metal that does not react with Mg.

Inserting Step S3

The inserting step S3 is a step of manufacturing a multifilamentary embedded material, that is, the embedded materials 100a and 100b by inserting the center material 106 and the plurality of monofilamentary wires 103 disposed around the center material 106 into the outer shell material 105 of which at least the inner circumferential surface is formed of the metal that does not react with Mg. By changing a material and a configuration used in the inserting step S3, it is possible to optionally determine which of the embedded material 100a according to the first embodiment and the embedded material 100b according to the second embodiment is to be manufactured.

Surface-Reduction Processing Step S4

The surface-reduction processing step S4 is a step (wire step) of performing surface-reduction processing on the multifilamentary embedded material to thin the multifilamentary embedded material. The surface-reduction processing step S4 can be performed using, for example, a drawbench. By performing the surface-reduction processing step S4, the wire diameters (thicknesses) of the embedded materials 100a and 100b can be set to a target wire diameter.

Heat Treatment Step S5

The heat treatment step S5 is a step of performing the heat treatment on the thinned multifilamentary embedded material (embedded materials 100a, 100b (see FIGS. 1 and 4 for the cross-sectional shape at this stage)) to allow Mg and B in the mixed powder 101a to react with each other to form the MgB$_2$ core material 101. The heat treatment step S5 can be suitably performed, for example, by raising a temperature to approximately 600° C. in a heat treatment device such as an electric furnace in a state where the thinned multifilamentary embedded material is wound around the bobbin 602.

In the producing method, by performing the above-described steps in the order described above, the superconducting wire rod 100A according to the first embodiment and the superconducting wire rod 100B according to the second embodiment in which the uneven deformation of the shape of the MgB$_2$ core material 101 is prevented can be suitably produced.

First Example

In a first example, the superconducting wire rod 100A having a structure shown in FIG. 1 was produced. The core 109 of the center material 106 is formed of Cu. The core 109 is coated with the second coating material 107 formed of Fe. A plurality of monofilamentary wires 103 in which the MgB$_2$ core material 101 is coated with the first coating material 102 formed of Fe are disposed so as to surround the center material 106. Then, the center material 106 and the monofilamentary wire 103 are disposed inside the pipe-shaped outer shell material 105 provided with the relaxation layer 104 of Fe inside the outer layer material 108.

The monofilamentary wire 103 was manufactured as follows. First, a predetermined amount of a pure Mg powder and a pure B powder were weighed and used as the mixed powder 101a using a ball mill. The mixed powder 101a was filled in a pipe formed of Fe, and surface-reduction processing using a drawbench was repeated to manufacture the monofilamentary wire 103 provided with the first coating material 102 formed of Fe.

A multifilamentary embedded material (embedded material 100a shown in FIG. 3) before wire processing was manufactured as follows. First, a rod (core 109) of Cu was inserted into a pipe formed of Fe to manufacture the center material 106. As necessary, processing with a drawbench or a swaging machine may be added to enhance adhesion between Fe and Cu. Accordingly, the center material 106 that includes the core 109 formed of Cu and is coated with the second coating material 107 formed of Fe was obtained.

Then, 10 monofilamentary wires 103 were disposed so as to surround the center material 106, and were inserted into the pipe formed of Fe. Further, the pipe formed of Fe was inserted into a pipe formed of Monel to manufacture the multifilamentary embedded material. As described above, by inserting the pipe formed of Fe into the pipe formed of Monel, the outer shell material 105 in which the relaxation layer 104 formed of Fe was disposed inside the outer layer material 108 formed of Monel was manufactured.

The manufactured multifilamentary embedded material was repeatedly subjected to the surface-reduction processing using the drawbench, and thinned to a predetermined wire diameter. Then, heat treatment was performed at approximately 600° C. to allow Mg and B in the mixed powder 101a to react with each other to obtain the MgB$_2$ core material 101, thereby producing the superconducting wire rod 100A.

A cross section of the superconducting wire rod 100A produced in this manner was observed and imaged with an optical microscope, and a drawing based on the observation and imaging is shown in FIG. 2. As shown in FIG. 2, it was confirmed that the MgB$_2$ core material 101 having the same shape is formed as a result of observing the cross section of the superconducting wire rod 100A. However, there is a part where it is difficult to distinguish between constituent elements.

Therefore, in order to make a boundary between the constituent elements conspicuous, the cross section of the superconducting wire rod 100A was subjected to chemical etching processing. Then, the cross section was observed and imaged with the optical microscope, and a drawing based on the observation and imaging is shown in FIG. 1. As shown in FIG. 1, it was confirmed that the second coating material 107, the first coating material 102, and the relaxation layer 104 that are disposed in the multifilamentary embedded material are disposed also in the thinned superconducting wire rod 100A. When thicknesses of these constituent elements were compared, the thicknesses were almost the same.

As shown in FIG. 1, it was confirmed that, since the superconducting wire rod 100A includes the first coating material 102, the second coating material 107, and the relaxation layer 104 of the outer shell material 105, it is possible to prevent uneven deformation of a shape of the MgB$_2$ core material 101 due to influence of deformation of the center material 106 and the outer shell material 105 during the surface-reduction processing which is insufficient only by providing a coating material on a monofilamentary wire and the like.

Second Example

The mixed powder 101a of a pure Mg powder and a pure B powder was manufactured in the same procedure as in the first example. The mixed powder 101a was filled in a pipe formed of Nb, and surface-reduction processing using a drawbench was repeated to manufacture the monofilamentary wire 103 provided with the first coating material 102 formed of Nb.

A multifilamentary embedded material (embedded material 100a) before wire processing was manufactured as follows.

First, a rod (core 109) of Cu was inserted into a pipe formed of Nb to manufacture the center material 106. Accordingly, the center material 106 that includes the core 109 formed of Cu and coated with the second coating material 107 formed of Nb was obtained. Then, 10 monofilamentary wires 103 were arranged so as to surround the center material 106, and were inserted into the pipe formed of Nb. Further, the pipe formed of Nb was inserted into a pipe formed of Monel to manufacture the multifilamentary embedded material. As described above, by inserting the pipe formed of Nb into the pipe formed of Monel, the outer shell material 105 in which the relaxation layer 104 formed of Nb was disposed inside the outer layer material 108 formed of Monel was manufactured.

The manufactured multifilamentary embedded material was repeatedly subjected to the surface-reduction processing using the drawbench, and was thinned to a predetermined wire diameter. Then, heat treatment was performed at approximately 600° C. to allow Mg and B in the mixed powder 101a to react with each other to obtain the MgB$_2$ core material 101, thereby producing the superconducting wire rod 100A.

It was confirmed that the MgB$_2$ core material 101 having the same shape is formed as a result of observing and imaging the cross section of the superconducting wire rod 100A produced in this manner with an optical microscope (see FIG. 2). The cross section of the superconducting wire rod 100A was subjected to chemical etching processing in the same manner as in the first example, and then observed and imaged with an optical microscope. As a result, it was confirmed that the MgB$_2$ core material 101 having the same shape is formed (see FIG. 1). From this, it was confirmed that the second coating material 107, the first coating material 102, and the relaxation layer 104 can be formed with Nb as well.

Then, from these results, it was confirmed that, even when these constituent elements are formed of Nb, since the superconducting wire rod 100A includes the first coating material 102, the second coating material 107, and the relaxation layer 104 of the outer shell material 105, it is possible to prevent uneven deformation of a shape of the $MgB_2$ core material 101 due to influence of deformation of the center material 106 and the outer shell material 105 during the surface-reduction processing which is insufficient only by providing a coating material on a monofilamentary wire and the like.

Third Example

The mixed powder 101a of a pure Mg powder and a pure B powder was manufactured in the same procedure as in the first example. The mixed powder 101a was filled into a pipe formed of Fe having a thickness larger than that of a pipe (first coating material 102) formed of Fe and used in the first Example. Thickness of pipe (first coating material 102) formed of Fe and used in first example: thickness of pipe (first coating material 102) formed of Fe and used in third Example was 1:1.5. Then, the pipe formed of Fe was repeatedly subjected to surface-reduction processing using a drawbench, and was processed to a predetermined wire diameter to manufacture the monofilamentary wire 103 provided with the first coating material 102 formed of Fe and having a large thickness.

Then, as in the first example, a rod (core 109) formed of Cu was inserted into the pipe formed of Fe to manufacture the center material 106. Accordingly, the center material 106 that includes the core 109 formed of Cu and coated with the second coating material 107 formed of Fe was obtained. Then, 10 monofilamentary wires 103 were arranged so as to surround the center material 106, and were inserted into the pipe formed of Fe. Further, the pipe formed of Fe was inserted into a pipe formed of Monel to manufacture the multifilamentary embedded material (embedded material 100a).

The manufactured multifilamentary embedded material was repeatedly subjected to the surface-reduction processing using the drawbench, and was thinned to a predetermined wire diameter. Then, heat treatment was performed at approximately 600° C. to allow Mg and B in the mixed powder 101a to react with each other to obtain the $MgB_2$ core material 101, thereby manufacturing the superconducting wire rod 100A.

A cross section of the superconducting wire rod 100A produced in this manner was subjected to chemical etching processing and observed and imaged with an optical microscope. As a result, in the third example, it was confirmed that the $MgB_2$ core material 101 having the same shape as in the first example and the second example is formed. When the thickness of the second coating material 107, the thickness of the first coating material 102, and the thickness of the relaxation layer 104 were compared, the thickness of the first coating material 102 in the superconducting wire rod 100A manufactured in the third example was larger than that in the superconducting wire rod 100A manufactured in the first example. From this, it was confirmed that the monofilamentary wire 103 having the same shape is formed even when the first coating material 102 becomes thick. That is, it was confirmed that the $MgB_2$ core material 101 having the same shape can be formed even when the thickness of the first coating material 102 is larger than the thicknesses of the second coating material 107 and the relaxation layer 104.

Even when the thickness of the first coating material 102 is smaller than the thickness of the second coating material 107 and the thickness of the relaxation layer 104, the $MgB_2$ core material 101 having the same shape was formed similarly to the above. From this, it was found that the second coating material 107 and the relaxation layer 104 play an important role in obtaining an effect of preventing uneven deformation of the shape of the $MgB_2$ core material 101.

Fourth Example

In a fourth example, the superconducting wire rod 100B having a structure shown in FIG. 4 was produced.

First, the mixed powder 101a of a pure Mg powder and a pure B powder was manufactured in the same procedure as in the first example. As in the first example, the mixed powder 101a was filled in a pipe formed of Fe, and the surface-reduction processing using a drawbench was repeated to manufacture the monofilamentary wire 103 provided with the first coating material 102 formed of Fe.

A multifilamentary embedded material (embedded material 100b shown in FIG. 5) before wire processing was manufactured as follows.

In the fourth example, the center material 106b was formed of only Fe. That is, the center material 106b was manufactured by processing a rod formed of Fe to a predetermined diameter. Then, 10 monofilamentary wires 103 were arranged so as to surround the center material 106b formed of Fe, and were inserted into the pipe formed of Fe. Then, the pipe formed of Fe was further inserted into a pipe formed of Monel to manufacture the multifilamentary embedded material.

The manufactured multifilamentary embedded material was repeatedly subjected to the surface-reduction processing using the drawbench, and was thinned to a predetermined wire diameter. Then, heat treatment was performed at approximately 600° C. to allow Mg and B in the mixed powder 101a to react with each other to obtain the $MgB_2$ core material 101, thereby producing the superconducting wire rod 100B.

A cross section of the superconducting wire rod 100B produced in this manner was subjected to chemical etching processing, observed and imaged with an optical microscope, and a drawing based on the observation and imaging is shown in FIG. 4. As shown in FIG. 4, it was confirmed that the $MgB_2$ core material 101 having the same shape is formed as a result of observing the cross section of the superconducting wire rod 100B.

From this, it was confirmed that, even the center material 106b is formed of Fe, uneven deformation of the shape of the $MgB_2$ core material 101 can be prevented as long as the first coating material 102 and the relaxation layer 104 are provided.

Comparative Example

FIG. 9 is a schematic cross-sectional view of a superconducting wire rod 100Z according to a comparative example. FIG. 10 is a schematic cross-sectional view of a superconducting wire rod 100z before wire processing according to the comparative example.

In the comparative example, the superconducting wire rod 100Z having a structure shown in FIG. 9 was manufactured.

As shown in FIGS. 9 and 10, the comparative example has a multifilamentary structure in which no coating material is provided on a center material 106z, and no relaxation layer is provided on an innermost side of an outer shell material 105z.

First, a mixed powder 101z (FIG. 10) of a pure Mg powder and a pure B powder was manufactured in the same procedure as in the first example. The mixed powder 101z was filled in a pipe formed of Fe, and the surface-reduction processing using a drawbench was repeated to manufacture a monofilamentary wire 103z (FIG. 10) provided with a coating material 102z formed of Fe.

Then, 10 single core wires 103z were arranged so as to surround the center material 106z formed of Cu, and were inserted into a pipe formed of Monel to manufacture a multifilamentary embedded material (superconducting wire rod 100z shown in FIG. 10) before wire processing.

The manufactured multifilamentary embedded material was repeatedly subjected to the surface-reduction processing using the drawbench, and was thinned to a predetermined wire diameter. Then, heat treatment was performed at approximately 600° C. to allow Mg and B in the mixed powder 101z to react with each other to obtain an $MgB_2$ core material 101Z, thereby manufacturing the superconducting wire rod 100Z (FIG. 9).

A cross section of the superconducting wire rod 100Z produced in this manner was subjected to the chemical etching processing, observed and imaged with an optical microscope, and a drawing based on the observation and imaging is shown in FIG. 9. As shown in FIG. 9, it was confirmed that a difference is observed in shapes of individual $MgB_2$ core materials 101Z and uneven deformation occurs as a result of observing the cross section of the superconducting wire rod 100Z.

From this, it is considered that only the coating material (sheath material) 102z formed of Fe and covering the $MgB_2$ core material 101Z is insufficient for influence of deformation due to processing of the center material 106z and the outer shell material 105z, which leads to uneven deformation of the shape of the $MgB_2$ core material 101Z.

Fifth Example

Next, as a fifth example, the superconducting coil 600 shown in FIG. 6 was manufactured. First, the bobbin 602 that is formed of a metal and is coated with the insulating material 601 formed of a glass braid was wound with the thinned embedded material 100a having a configuration that is shown in the first example and is similarly coated with the insulating material of the glass braid. Then, the bobbin 602 was subjected to heat treatment at approximately 600° C. to obtain the $MgB_2$ core material 101 to produce the superconducting wire rod 100A. Then, after that, the superconducting wire rod 100A was fixed by being impregnated with a resin to manufacture the superconducting coil 600.

The manufactured superconducting coil 600 was set in the cryostat 603, was cooled by a refrigerant or a refrigerator, and was made to be energized. By doing so, the superconducting coil 600 can generate a magnetic field.

Sixth Example

Next, as a sixth example, the open type MRI device 700A shown in FIG. 7 was manufactured. The MRI device 700A includes the pair of static magnetic field generating units 701 and 701 and a coupling member (not shown). The gradient magnetic field generating units 703 and 703 are disposed so as to sandwich the imaging area 702 formed by the pair of static magnetic field generating units 701 and 701 and the coupling member. The MRI device 700A includes a bed 705 on which an object 704 is placed, and a conveyance mechanism 706 that conveys the object 704 placed on the bed 705 to the imaging area 702.

In the pair of static magnetic field generating units 701 and 701, the superconducting coil 600 described in the fifth example is set in the cryostat 603, and is cooled by a refrigerant or a refrigerator. The pair of static magnetic field generating units 701 and 701 are energized in this state to generate a static magnetic field.

As described above, the superconducting wire rod, the superconducting coil, the magnetic generator, and the method for producing the superconducting wire rod according to the invention is described in detail with reference to the embodiments and the examples, but the gist of the invention is not limited to this, and includes various modifications. For example, the embodiments described above are described in detail for easy understanding of the invention, and the invention is not necessarily limited to the embodiment including all the configurations described above. A part of the configuration of one embodiment can be replaced with the configuration of another embodiment, and the configuration of another embodiment can be added to the configuration of one embodiment. A part of the configuration of each embodiment can be added to, deleted from, and replaced with other configurations.

REFERENCE SIGN LIST 100A, 100B superconducting wire rod
100a, 100b embedded material
101 $MgB_2$ core material ($MgB_2$ superconductor core material)
102 first coating material
103 monofilamentary wire
104 relaxation layer
105 outer shell material
106, 106b center material
107 second coating material
108 outer layer material
109 core
101a mixed powder
600 superconducting coil
700 magnetic generator

The invention claimed is:

1. A superconducting wire rod comprising:
a center material of which at least an outer circumferential surface is formed of a metal that does not react with Mg;
a plurality of monofilamentary wires arranged around the center material, the plurality of monofilamentary wires each including an $MgB_2$ superconductor core material coated with a first coating material formed of a metal that does not react with Mg; and
an outer shell material disposed outside the plurality of monofilamentary wires,
wherein at least an inner circumferential surface of the outer shell material is formed of a metal that does not react with Mg,
wherein the center material is formed of a core formed of a metal capable of reacting with Mg and a second coating material formed of a metal that does not react with Mg and coating the core, or is formed of a metal that does not react with Mg, and
wherein a thickness of the first coating material is larger than a thickness of the second coating material.

2. The superconducting wire rod according to claim 1, wherein the metal capable of reacting with Mg is Cu.

3. The superconducting wire rod according to claim 1, wherein the outer shell material has at least two layers, and an innermost layer that includes the inner circumferential surface is a relaxation layer formed of the metal that does not react with Mg.

4. The superconducting wire rod according to claim 1, wherein the metal that does not react with Mg is at least one selected from a group of Fe, Nb, and Ta.

5. The superconducting wire rod according to claim 1, wherein the first coating material, the outer circumferential surface of the center material, and the inner circumferential surface of the outer shell material are formed of the same metal.

6. The superconducting wire rod according to claim 3, wherein a thickness of the first coating material is larger than a thickness of the relaxation layer.

7. A superconducting coil using the superconducting wire rod according to claim 1.

8. A magnetic generator using the superconducting coil according to claim 7.

9. A method for producing a superconducting wire rod, the method comprising:
- a filling step of filling a mixed powder of an Mg powder and a B powder into a first coating material formed of a metal that does not react with Mg to manufacture a monofilamentary wire;
- an arranging step of arranging a plurality of the monofilamentary wires around a center material of which at least an outer circumferential surface is formed of a metal that does not react with Mg;
- an inserting step of manufacturing a multifilamentary embedded material by inserting the center material and the plurality of the monofilamentary wires arranged around the center material into an outer shell material of which at least an inner circumferential surface is formed of a metal that does not react with Mg;
- a surface-reduction processing step of performing surface-reduction processing on the multifilamentary embedded material to thin the multifilamentary embedded material; and
- a heat treatment step of performing heat treatment on the thinned multifilamentary embedded material to allow the mixed powder to react to form an $MgB_2$ superconductor core material, wherein the center material is formed of a core formed of a metal capable of reacting with Mg and a second coating material formed of a metal that does not react with Mg and coating the core, or is formed of a metal that does not react with Mg, and wherein a thickness of the first coating material is larger than a thickness of the second coating material.

* * * * *